(12) United States Patent
Belley

(10) Patent No.: US 6,977,657 B2
(45) Date of Patent: Dec. 20, 2005

(54) ADDRESSING A CACHE

(75) Inventor: Benoit Belley, Montréal (CA)

(73) Assignee: Autodesk Canada Co., Montreal (CA)

( * ) Notice: Subject to any disclaimer, the term of this patent is extended or adjusted under 35 U.S.C. 154(b) by 0 days.

(21) Appl. No.: 10/214,643

(22) Filed: Aug. 8, 2002

(65) Prior Publication Data

US 2002/0196261 A1 Dec. 26, 2002

Related U.S. Application Data

(63) Continuation of application No. 09/400,557, filed on Sep. 21, 1999, now Pat. No. 6,469,705.

(51) Int. Cl.[7] .................................................. G09G 5/36
(52) U.S. Cl. ........................ 345/557; 345/568; 711/202; 711/3
(58) Field of Search ................................. 345/557, 511, 345/573, 568, 549; 711/207, 206, 131, 3, 220, 118, 170, 202, 122, 125, 134, 128, 203; 712/42; 382/236; 717/156

(56) References Cited

U.S. PATENT DOCUMENTS

| | | | |
|---|---|---|---|
| 5,226,133 A | | 7/1993 | Taylor |
| 5,361,340 A | * | 11/1994 | Kelly et al. ..................... 711/3 |
| 5,426,750 A | * | 6/1995 | Becker et al. ............... 711/207 |
| 5,671,389 A | | 9/1997 | Saliba |
| 5,884,098 A | | 3/1999 | Mason, Jr. |
| 5,913,222 A | | 6/1999 | Liedtke |
| 6,130,680 A | * | 10/2000 | Cox et al. .................... 345/511 |
| 6,282,625 B1 | * | 8/2001 | Porterfield ................... 711/206 |
| 6,330,366 B1 | * | 12/2001 | Chen .......................... 382/236 |
| 6,331,854 B1 | * | 12/2001 | Rogers et al. .............. 345/573 |
| 6,442,667 B1 | * | 8/2002 | Shiell et al. ................ 711/207 |

OTHER PUBLICATIONS

Schmimmel, C., "Review of UNIX Kernel Internals," UNIX® Systems for Modern Architectures; Symmetric Multiprocessing and Caching for Kernel Programmers, Addison–Wesley Publishing Company, 1994, ISBN 0–201–63338, pp. 1–15.

Schmimmel, C., "Introduction to Cache Memory Systems," UNIX® Systems for Modern Architectures; Symmetric Multiprocessing and Caching for Kernel Programmers, Addison–Wesley Publishing Company, 1994, ISBN 0–201–63338, pp. 23–51.

* cited by examiner

Primary Examiner—Matthew C. Bella
Assistant Examiner—Dalip K. Singh
(74) Attorney, Agent, or Firm—Gates & Cooper LLP

(57) ABSTRACT

A data processing system has main memory and one or more caches. Data from main memory is cached while mitigating the effects of address pattern dependency. Main memory physical addresses are translated into main memory virtual address under the control of an operating system. The translation occurs on a page-by-page basis such that some of the virtual address bits are the same as some of the physical address bits. A portion of the address bits that are the same are selected and cache offset values are generated from the selected portion. Data is written to the cache at offset positions derived from the cache offset values.

7 Claims, 13 Drawing Sheets

| SELECTED LINE ADDRESS BITS | | | | | | |
|---|---|---|---|---|---|---|
| A13 | A12 | A11 | A10 | A9 | A8 | A7 |
| PROVIDES 32 BUFFER ALIGNMENTS TO CHOOSE FROM (= 32 "COLORS") | | | | | PROVIDES AT LEAST 4 LINES BETWEEN ADJACENT BUFFERS | |

ADDRESSING A CACHE

CROSS REFERENCE TO RELATED APPLICATIONS

This application is a continuation of commonly-assigned U.S. patent application Ser. No. 09/400,557, filed Sep. 21, 1999, which issued on Oct. 22, 2002 as U.S. Pat. No. 6,469,705, by Benoit Belley, entitled "CACHE ADDRESSING", which application is incorporated by reference herein.

FILED OF THE INVENTION

The present invention relates to accessing data via a memory cache, wherein a plurality of buffer addresses are defined in response to processing requirements.

INTRODUCTION TO THE INVENTION

As computer system design continues to develop, design criteria are dictated by the cost and efficiency of the components that are available. Processor speeds continue to increase at a greater rate than memory access speeds, and so the problem of speed mismatch between the memory and the processor is becoming more of an issue as time progresses. Many design strategies have been developed in order to deal with the mismatch in, and these arts are becoming increasingly diverse, as every possible way of reducing this mismatch is employed. In recent years, the design of memory chips has included the introduction of numerous variations of the basic static and dynamic memory, types, including synchronous static RAM and synchronous dynamic RAM etc.

A common technique for reducing the time of memory access is the use of a memory cache. At its simplest, a cache contains a copy of data from memory locations that have been recently used. Because the cache has a relatively small capacity, it can be constructed from memory chips that have the fast access times required to keep up with the processor. A typical arrangement is the use of a primary cache and a secondary cache. The primary cache may exist on the same area of silicon as the processor, thus enabling a large number of short electrical connections to be made and, thereby improving the speed of data transfer. Having a primary cache on the same chip as the processor also enables various cache operations to be performed in a highly optimised manner, for example, by using information from an out-of-sequence execution controller to improve cache efficiency.

An on-chip cache is expensive to implement, and therefore is limited in size. A much larger secondary cache can be implemented off-chip, perhaps with the aid of control logic supplied directly from the processor, so that only a small number of memory chips are required in order to implement a substantial secondary cache. The secondary cache runs at a slower speed than the primary cache because it is not on the same chip as the processor. In operation, it is hoped that data will be found in the primary on-chip cache. If not, the much larger secondary cache can be addressed with a slight time penalty. Typically, ninety percent of addressing will find data in either the primary cache or the secondary cache. Only if data is not available from either cache does the processor need to access the much slower main memory.

A further known implementation is the provision of separate primary data and instruction caches on the processor chip. This enables data and instructions to be fetched simultaneously, most of the time, even though, outside the processor, no distinction is made between memory used for data and memory used for instructions.

A high reliance on high speed processing circuitry with the use of memory caching, can result in a significant loss of overall processing power under certain circumstances. The efficiency of cache circuits is highly dependent upon the pattern of data access. Practical cache designs suffer from an inherent weakness, in that certain repeated patterns of data access result in extremely long data transfer times. Because such patterns are statistically unlikely to occur, this problem is usually ignored. However, in either safety critical systems, or systems where an extremely high bandwidth must be guaranteed, even a low probability of this problem occurring has a very high cost.

A particular application that relies on the use of high speed processing to perform a sequence of highly patterned data access is that of image processing. When processing live video signals, for example, it is necessary to provide a guaranteed frame-by-frame output at a particular rate. Many image processing algorithms are one-pass algorithms. Audio processing also makes use of one pass algorithms. In image processing, these types of algorithm take a single pixel from a first image, process it, possibly with a corresponding pixel from other images, and generate an output pixel. This pattern of access is repeated many hundreds of thousands of times for a single image frame. The pattern of addressing results from the relative locations in memory of the buffers used for input and output image frames. Under these conditions, the rare occasions when pattern-dependent cache addressing problems occur are usually disastrous, perhaps resulting in a slow-down of fifty times or more. Even though this type of slow down may be extremely unlikely, the slight chance of it occurring, at random, renders this type of system unsuitable for a critical live broadcast environment.

It is an object of the present invention to provide an improved solution to addressing data via a cache.

SUMMARY OF THE INVENTION

According to a first aspect of the present invention, there is provided a processing apparatus comprising processing means, main memory means and caching means, wherein an application processing executing on said processing apparatus executes instructions on said processing means and accesses data in main memory via said cache, and said processing means is configurable by a configuration process so as to: access locations in main memory with reference to addresses, each comprising virtual and physical address bits; identify selected bits of said physical address bits that select areas of said cache; and identify permutations of said selected bits to define buffer alignments in main memory, in response to an identification of requirements of said application process made by said configuration process.

Preferably, the processing requirements are repeated by a processing graph, including buffer nodes and processing nodes.

According to a second aspect of the present invention, there is provided a method of allocating main memory for buffers, wherein locations in main memory are accessed with reference to addresses, each comprising address bits; selected bits of said address bits identify common address bits in a primary cache in a secondary cache; permutations of said selected bits identify preferred buffer alignments; and said permutations are allocated to buffers in response to an identification of processing requirements.

DETAILED DESCRIPTION OF THE PREFERRED EMBODIMENTS

Figure 1:
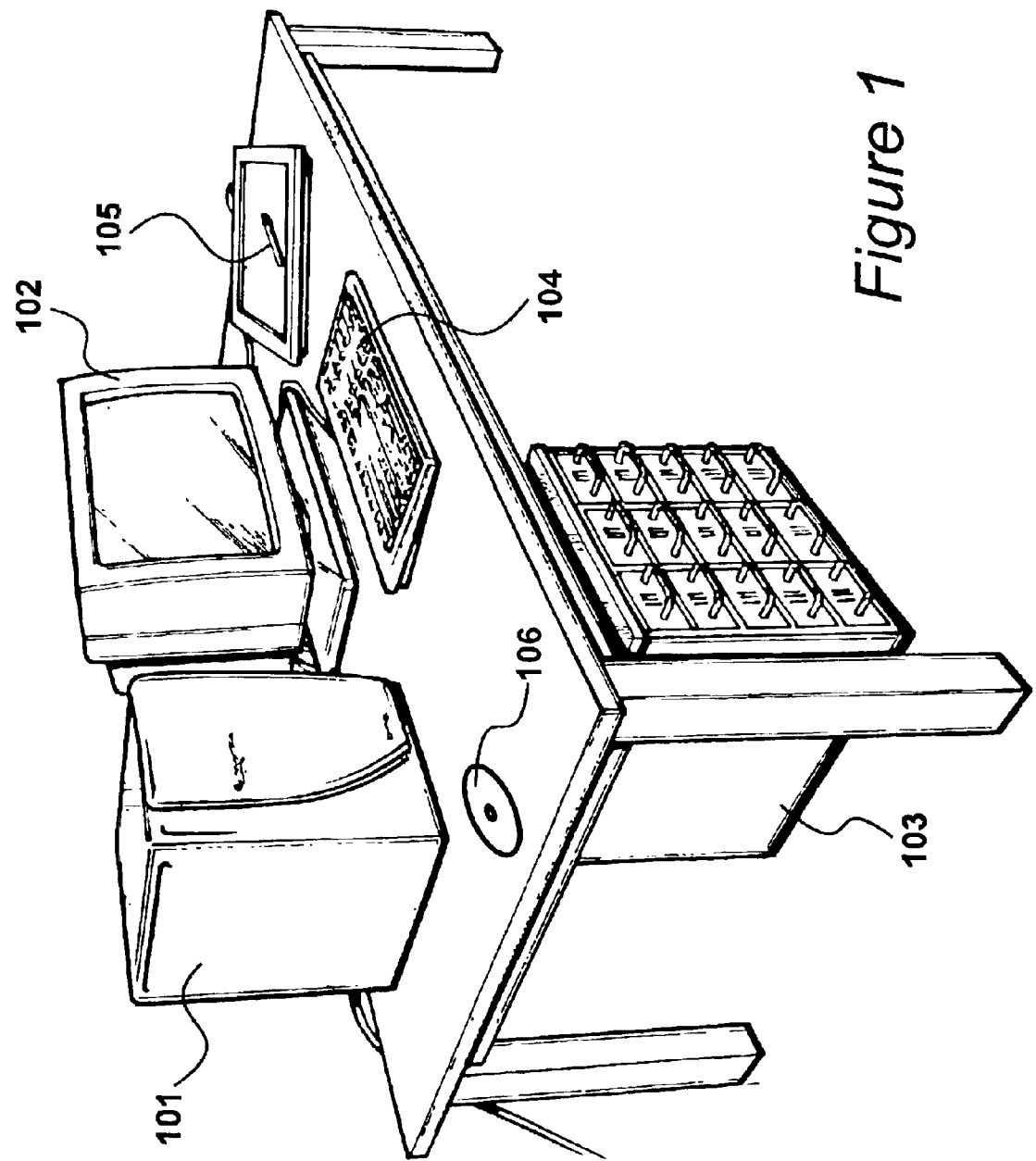
FIG. 1 shows an image processing environment, including a processing system.

A system for editing and generating image data and other types of data is illustrated in FIG. 1. A processing system 101, such as an Octane™ produced by Silicon Graphics Inc., supplies image signals to a video display unit 102. Moving image data is stored on a striped redundant array of inexpensive discs (RAID) 103. The RAID is configured in such a way as to store a large volume of data, and to supply this data at a high bandwidth, when required, to the processing system 101. The operator controls the processing environment formed by the processing system 101, the video monitor 102 and the RAID 103, by means of a keyboard 104, and a stylus-operated graphics tablet 105. Instructions controlling the processing system 101 interpret user commands from the keyboard 104 and the graphics tablet 105, such that moving image data, and other media data, may be viewed, edited and stored to define a scene.

A short sequence of video frames, usually from one particular camera, is known as a clip. A scene is constructed from a number of clips, usually arranged sequentially, although certain effects may combine two or more clips at the same time. Typically, the video material will include a mono or stereo soundtrack, which may be heard through loudspeakers contained in the video monitor. Other data, including camera motion tracking data, may be supplied to the processing system 101 via interfaces.

The processing system 101 includes a CD ROM reader to allow executable instructions to be read from an instruction carrying medium in the form of the CD ROM 106. In this way, executable instructions are installable onto the processing system 101 for subsequent execution, thereby implementing the procedures of the preferred embodiment.

Figure 2:
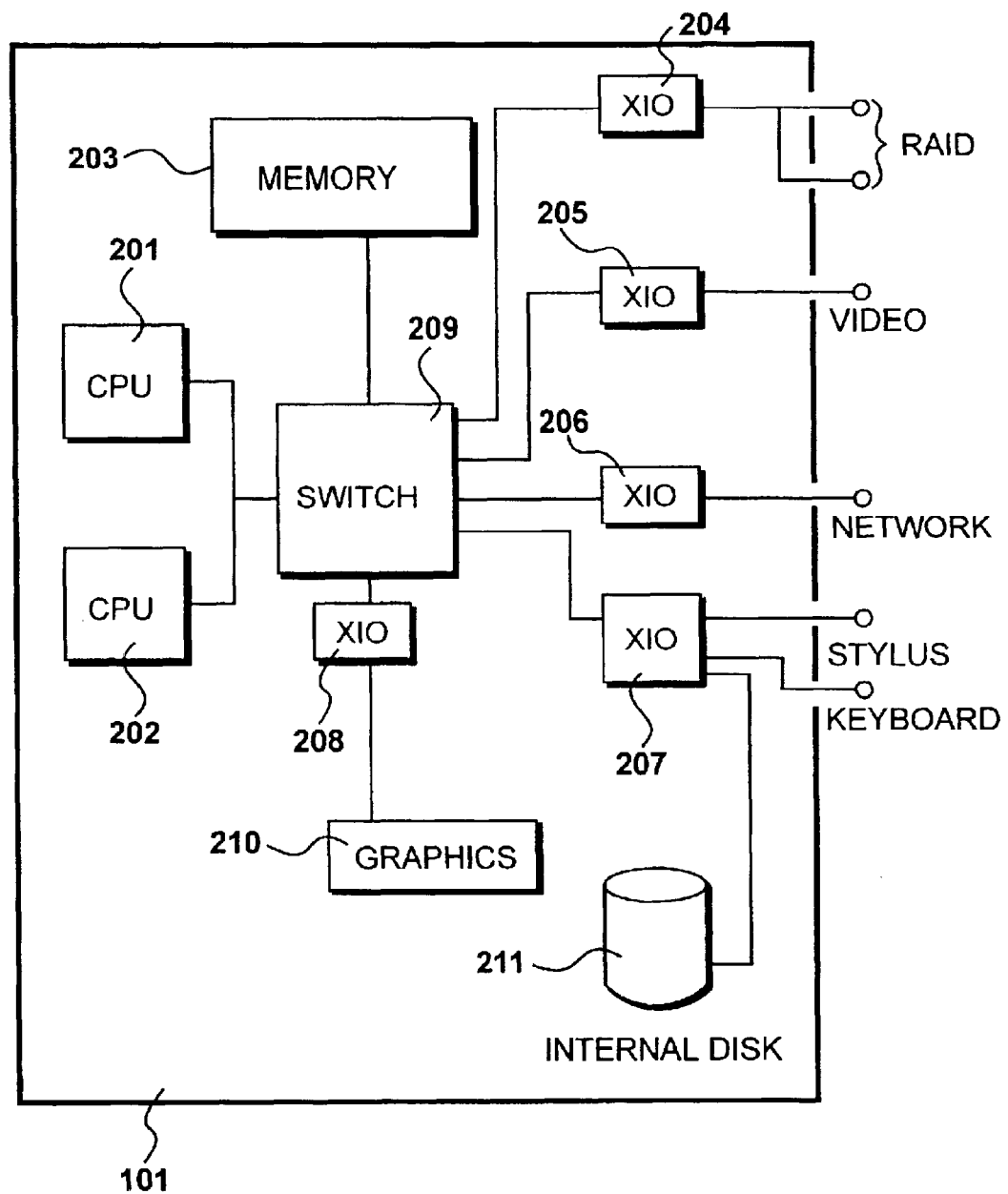
FIG. 2 details the processing system shown in FIG. 1, including processors, an interface and memory.

The processing system 101 shown in FIG. 1 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the processors 201 and 202, and a memory 203 and peripherals. The memory 203 comprises two gigabytes of dynamic RAM, although this may up to four gigabytes in size. This memory is used to store instructions for the processors, and data, usually excluding moving image data. The data stored in the memory 203 includes structured data, that includes references to other data held within this memory, and data that is held elsewhere, for example moving image data which is preferably stored in the RAID array 103. The instructions held within the memory 203 enable the processors 201 and 202 to determine ways of combining and presenting media data, as defined by the structured data, and these combinations and presentations may be considered as being presented from a particular view. The view usually also renders non-visual data, such as audio data, and other data that may be associated with visual data.

Input and output interface circuits are fitted in interface connector slots in the processing system shown in FIG. 2. These connectors are known as XIO slots. External connections, and connections to slow peripherals within the processing system 101, such as serial ports, are made via XIO circuits in these interface slots. These circuits provide synchronisation between the peripheral circuits and the extremely high speed data paths of the main processor structure.

A first XIO interface circuit board 204 provides bi-directional connections to the RAID array 103 shown in FIG. 1, and possibly to an additional RAID array, should it become necessary to provide additional storage for moving image data. A second XIO interface circuit 205 provides an interface to serial digital video input and output connections, conforming to the CCIR 601 standard. A third XIO interface circuit 206 provides a data connection to a network, over which data of various sorts may be shared. A further XIO interface circuit 207 facilitates connection with the graphics tablet 105 and the keyboard 104 shown in FIG. 1. Also connected is an internal hard disk drive 211, eight gigabytes in size, upon which instructions for the processors 201 and 202 are stored. An further additional XIO interface circuit provides a connection between the cross-bar switch 209 and a graphics processor 210. The graphics processor 210 receives instructions from processors 201 and 202 in such a way as to supply image data for display on the video monitor 102.

Figure 3:
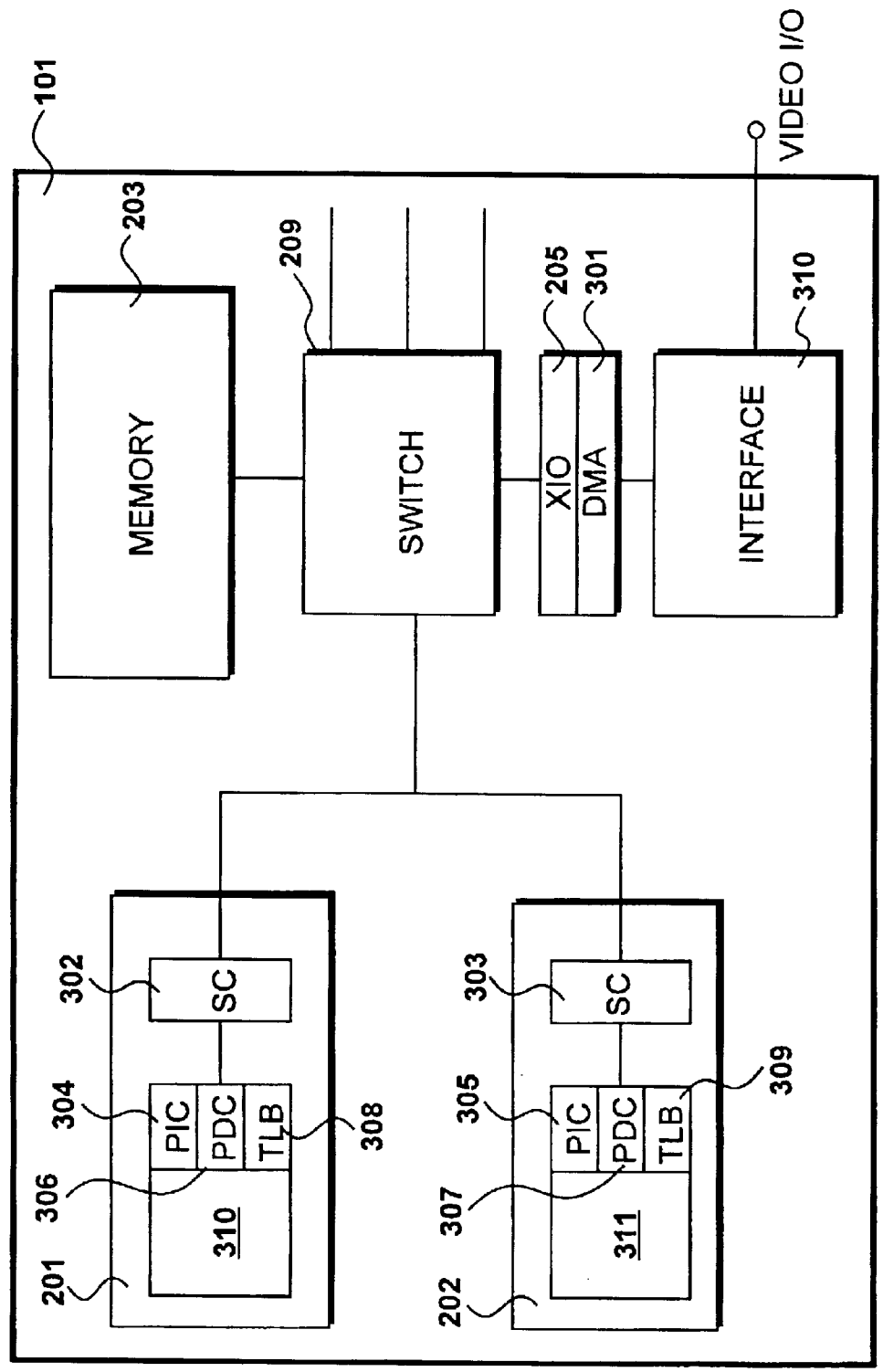
FIG. 3 details the processors and interface shown in FIG. 2, including a DMA circuit, a secondary cache, a primary data cache and a translation look-a-side buffer.

Details of the components relating to the present invention are shown in FIG. 3. The video interface XIO circuit 205 includes a Direct Memory Access circuit 301, that facilitates direct transfer of image data between the video interface circuitry 310 in the XIO slot 205 and the main system memory 203, without the need for intervention from either of the processors 201 and 202.

Each of the processors 201 and 202 includes a secondary cache (SC) 302 and 303, a primary instruction cache (PIC) 304 and 305, a primary data cache (PDC) 306 and 307 and a translation look-a-side buffer (TLB) 308 and 309. Full details of the R10000 processor may be found in the MIPS R10000 Microprocessor User's Manual, which is available at http://www.sgi.com/processors/r10 k/tech_info.

Taking the first processor 201 as an example, the secondary cache 302 consists of between 512 k bytes and 16M bytes of high speed synchronous static RAM. In the present embodiment this is 2M bytes in size. The secondary cache is an off-chip cache, with control logic being provided directly by the processor itself. The on-chip primary instruction cache 304 and the primary data cache 306 are both 32 k bytes in size. These provide separate paths for data and instructions, so that data and instructions may be supplied in parallel to the processing unit 310. The primary caches 304 and 306 are both two way set-associative. The full details of the operations of this and other related types of cache are described in chapter two of "Unix Systems for Modern Architectures" by Curt Schimmel, ISBN 0-201-63338-8. The secondary cache is also a two-way set-associative cache.

Both the primary and secondary caches suffer from problems of address pattern dependency, in that, when certain memory addressing patterns occur, the cache becomes very inefficient.

Figure 4:
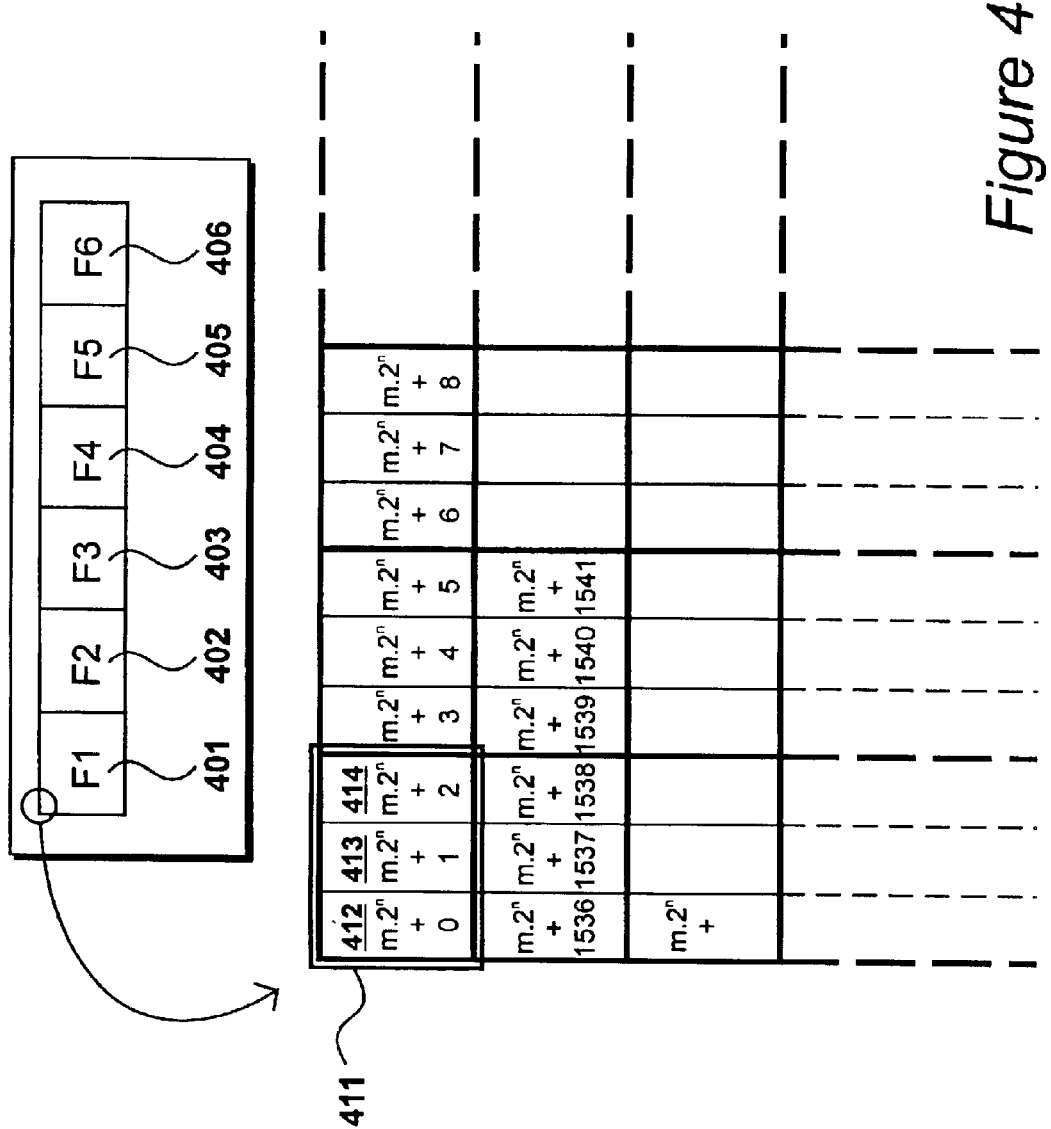
FIG. 4 details a pattern of data storage for a video image.

FIG. 4 illustrates a data access pattern for a frame of video data. A sequence of frames 401 to 406 is being transferred by the DMA circuit 301 to the memory 203. The upper left corner of the first frame 401 is enlarged in FIG. 4 so that the addresses for its destination in memory 203 can be seen.

The first pixel 411 has three bytes 412, 413 and 414, representing red, green and blue colour amplitudes. The base address for the first frame 401 is a multiple m of a power of two, written in the Figure as m times two to the power n. A multiple of a power of two is necessary due to requirements of the DMA circuitry 301 and of the design of the main memory controller. The first byte 412 is stored at this address. The second byte 413 is stored at the base address plus one, and the third byte 414 is stored at the base address plus two. The bytes for the next pixel occupy the next three addressed locations, and so on, for the rest of the pixels in that line. In the example, there are 512 pixels per line. In this case, the second line starts at m times two to the power n plus 1536. This represents the pattern of memory locations used to store the first frame 401. The second frame may be stored at a base address of (m+x) times two to the power n, where x is incremented for each frame.

Depending upon the precise details of the secondary cache, and the size of images that are being transferred, it is possible that address patterns will occur that result in a loss of cache efficiency when these image frames are subsequently processed by a processor 201 or 202 via its respective secondary cache 302 or 303.

Figure 5:
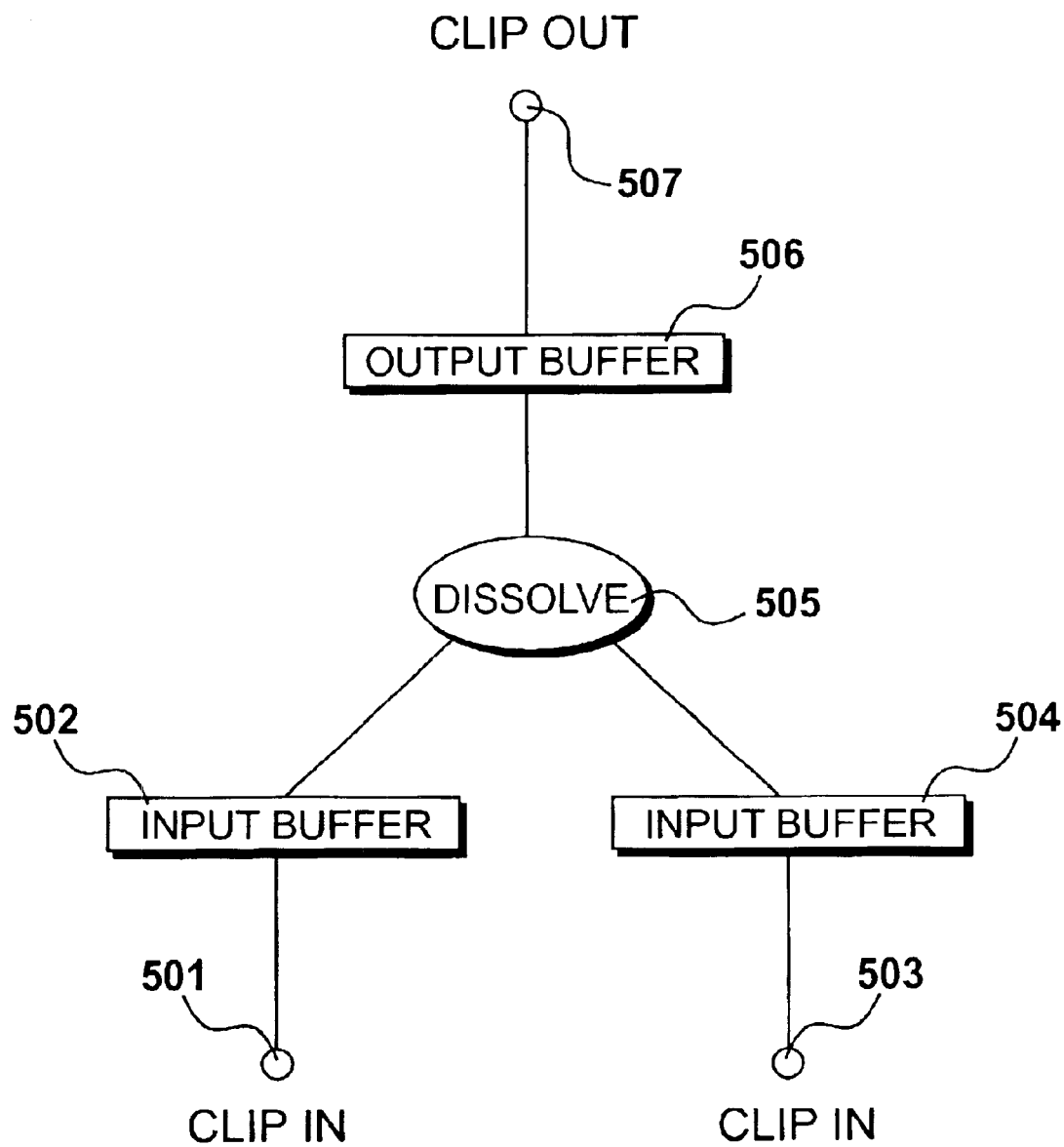
FIG. 5 illustrates the processing graph of a process operating on the processing system shown in FIG. 2.

An example of an application process running on the processing system 101 is shown in FIG. 5. A first clip 501 is fetched and stored in an input buffer 502. An input image buffer is an area of locations in memory 203, accessed as illustrated in FIG. 4. A second clip 503 is simultaneously fetched and stored in a second buffer 504. A processing node 505 performs a dissolve operation by combining pixels from the two input buffers 502 and 504, and stores the resulting blend in an output buffer 506. The output from the processing node 505 is then supplied as an output clip 507.

The structure shown in FIG. 5 is known as a processing graph or dependency graph, and is used to determine allocation of system processing and memory resources in order to perform operations for a particular set of processing operations for a scene, each represented by a processing node in the processing graph. In a typical image compositing application, many more processing nodes and buffers will be present. The dissolve effect provides an example that will be used to illustrate the problems of cache address pattern dependency. However, the same problem occurs with a wide variety of commonly used one-pass image processing algorithms, including colour correction, colour keying, compositing, video format conversion, time warping, motion blur and filtering.

The processing graph shown in FIG. 5 includes a central processing node 505, which performs the actual processing of the data. In a normal dissolve process, a pixel is selected from the top left corner of the frame from the first clip 501, and the data for this pixel is read from the buffer 502. The corresponding pixel in the second input buffer 504 is also read. The output is a weighted average of the two pixels. For the first frame in the dissolve, most of the output will be from the pixel in the first buffer. From near to the end of the period of the dissolve, most of the output will be from the second input buffer 504. Each pair of pixels from the input buffers 502 and 504 will result in a single output pixel being stored in the output buffer 506.

Figure 6:
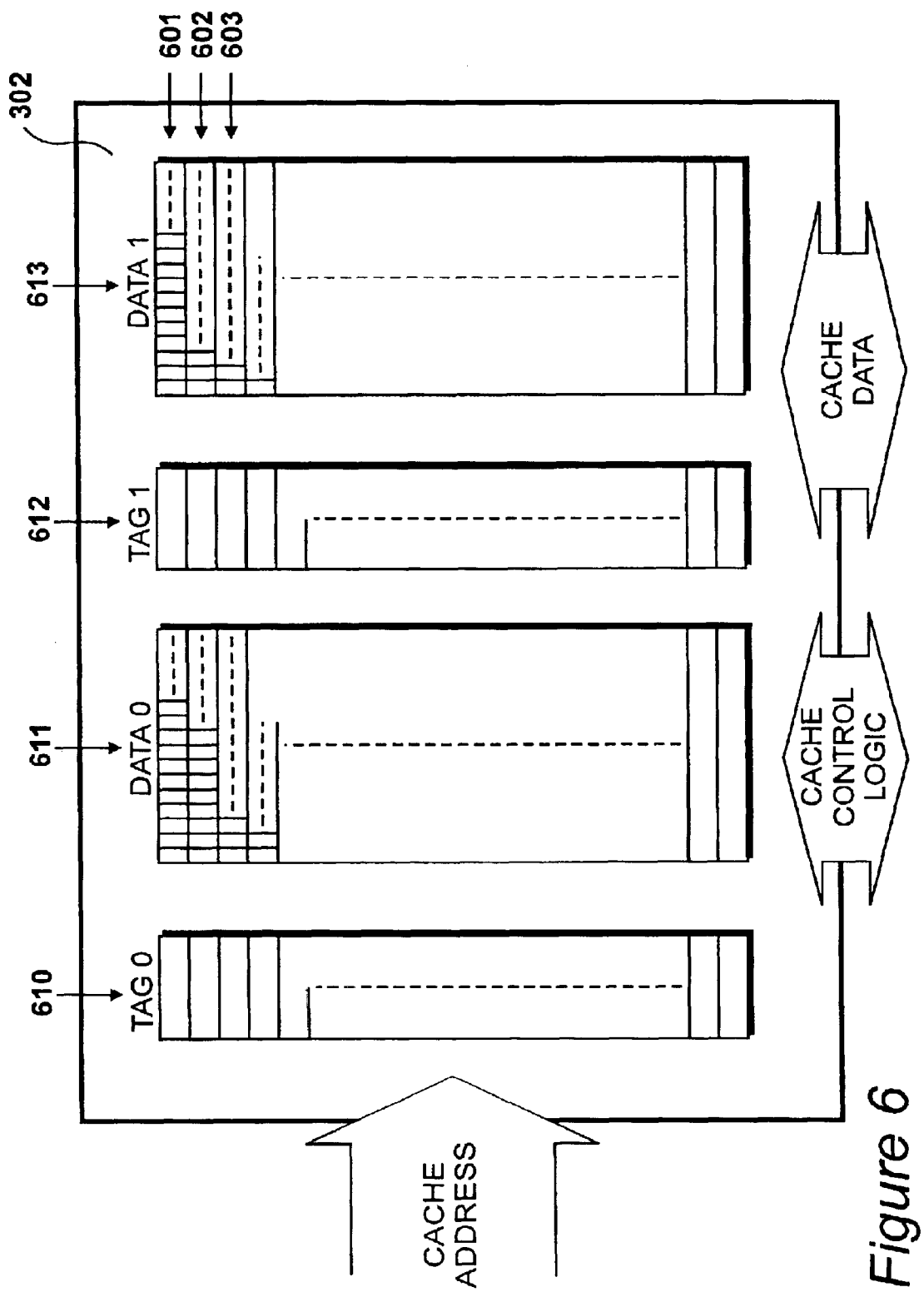
FIG. 6 details the secondary cache shown in FIG. 3.

The secondary cache 302 for the processor 201 shown in FIG. 3 is detailed in FIG. 6. The cache consists of lines 601, 602 and 603. In the present example there are 8192 lines, given a 2M byte secondary cache size. In this cache, each line has a tag 610 and data 611 in a first column, and a tag 612 and data 613 in a second column. The provision of two columns provides what is known as a two-way set associative cache. The operation of the cache will be described with reference only to the tag 610 and data 611 of the first column. A cache address is generated by excluding the most significant bits from the address field generated by the processor 201 as it attempts to address a memory location. This is known in the art as a modulo address hash function. The cache address, generated in this way, is used to select a line 601, 602 or 603, and also a byte within the line 611. The MIPS R10000 may be configured to control a cache having sixty-four or one hundred and twenty-eight data bytes in each line. In the present embodiment the cache is configured for one hundred and twenty-eight bytes per line.

The tag 610 for each line consists of an address and a validity flag. When reading data, the cache address lines initially select a line, ie line 601. The tag 610 for that line is checked to see if the validity flag is set. If so, it is known that the one hundred and twenty-eight data bytes in that line are valid. Simultaneously, the address stored in the tag 610 is compared with the full address generated by the processor. If these match, then it is known that the data in the line is the data that is required by the processor, and a read operation can commence. If the address of the tag for the line does not match the address generated by the processor, then it is known that the data must be obtained from the main memory 203.

An additional flag for the cache line indicates whether or not any of the data bytes currently in that line have been modified, and therefore must be updated in main memory 203 before the cache line is re-used. Because this flag does not specify which of the bytes is modified, the whole one hundred and twenty-eight bytes must be written back even if only one of the bytes has been modified. If none of the bytes is modified, then this write back operation does not need to be performed. Thereafter, a new hundred and twenty-eight bytes are read from the main memory into the line. The tag is updated with the new base address of the line, so that subsequent attempts to read data from the same location, or any of the hundred and twenty-eight locations that have been loaded into the cache line 611, will result in reading from the cache, not from the main memory 203.

The 2M bytes of cache memory are mapped repeatedly onto the much larger main memory, which is 2 Gbytes in size. Thus, a single location in the cache is responsible for caching data for a plurality of main memory locations. These memory locations are usually spaced well apart, and so the cache is unlikely to have to throw away and re-read an entire cache line each time the processor generates a new address. When this does happen, it is known as cache thrashing. When a cache line does not contain the data that needs to be read, the time taken to read data from main memory is extremely long, as one hundred and twenty-eight bytes must be read to completely fill up the cache line. If any of the bytes in the line had been modified, then all hundred and twenty-eight will have to be written back to main memory before the line can be re-used. The speed of data transfer between the cache and the main memory is slow, because the main memory consists of cheap high-capacity dynamic RAM that requires longer access cycles than the fast static RAM used in the secondary cache.

Usually this penalty is tolerable, because nearby locations are used repeatedly in most processing. In a typical processing environment, on average, cache data will be valid for around ninety percent of operations. However, it is possible that certain patterns of data access will result in significant repeated re-loading of the same cache lines. This is very time consuming. A typical solution is the provision of a number of columns, as in the two-way set-associative cache shown in FIG. 6. In addition to tag data, a least recently used (LRU) bit indicates which way, (left or right, zero or one), contains the least recently used data. When a line of data needs to be updated, the LRU bit is checked to see which way is least recently used. The least recently used is updated with the new data. This represents an improvement over the situation when only one way is available, and it is common to have cache circuits with four or more ways, to somewhat reduce the problem of address pattern dependency. However, in the worst cases of pattern dependency, this solution is not sufficient to avoid an extreme loss of processing power.

In certain types of processing, operations are performed repeatedly many thousands of times. If it should happen that a pattern dependency is consistent for each iteration of such a process, then the performance penalty will be enormous. Under these circumstances it is preferable to analyse the data storage scheme that is being used in order to prevent such access patterns occurring. For example, in FIG. 5, if the two input buffers 502 and 504 are aligned badly, it is possible that each time a pixel is accessed from the first buffer, it results in a cache line being re-loaded, because a pixel from the second buffer also is cached by the same line.

As the process selects a pixel from each buffer, every time, a cache line is re-loaded. This results in a disastrous reduction in memory bandwidth. The same problem occurs with any group of badly aligned buffers that are sequentially accessed in this way. So, for example, if the two input buffers 502 and 504 and the output buffer 506 were badly aligned, the same problem might occur. This problem is unlikely to occur, because only a small minority of the possible buffer address offsets result in this behaviour. However, it may be difficult or impossible to specify whether or not this is going to occur, in which case the reliability and quality of the system may, for certain critical applications, be insufficient.

A solution to this problem is to select base addresses for buffers carefully. A problem exists with this solution when using the R1000 and many other microprocessors. The R10000 uses virtual addressing. This is a scheme in which the real, physical addresses of main memory 203 are hidden from the processes running on the processor, except for the operating system's kernel. Virtual addressing is described in chapter one of the aforementioned reference, "Unix Systems for Modern Architectures". The advantage of virtual addressing is that applications can be relocated in physical memory whenever they are needed, and certain useful aspects of software behaviour, such as swapping rarely used processes to disk, memory protection, and memory mapping of files, can be implemented with high efficiency.

Figure 7:
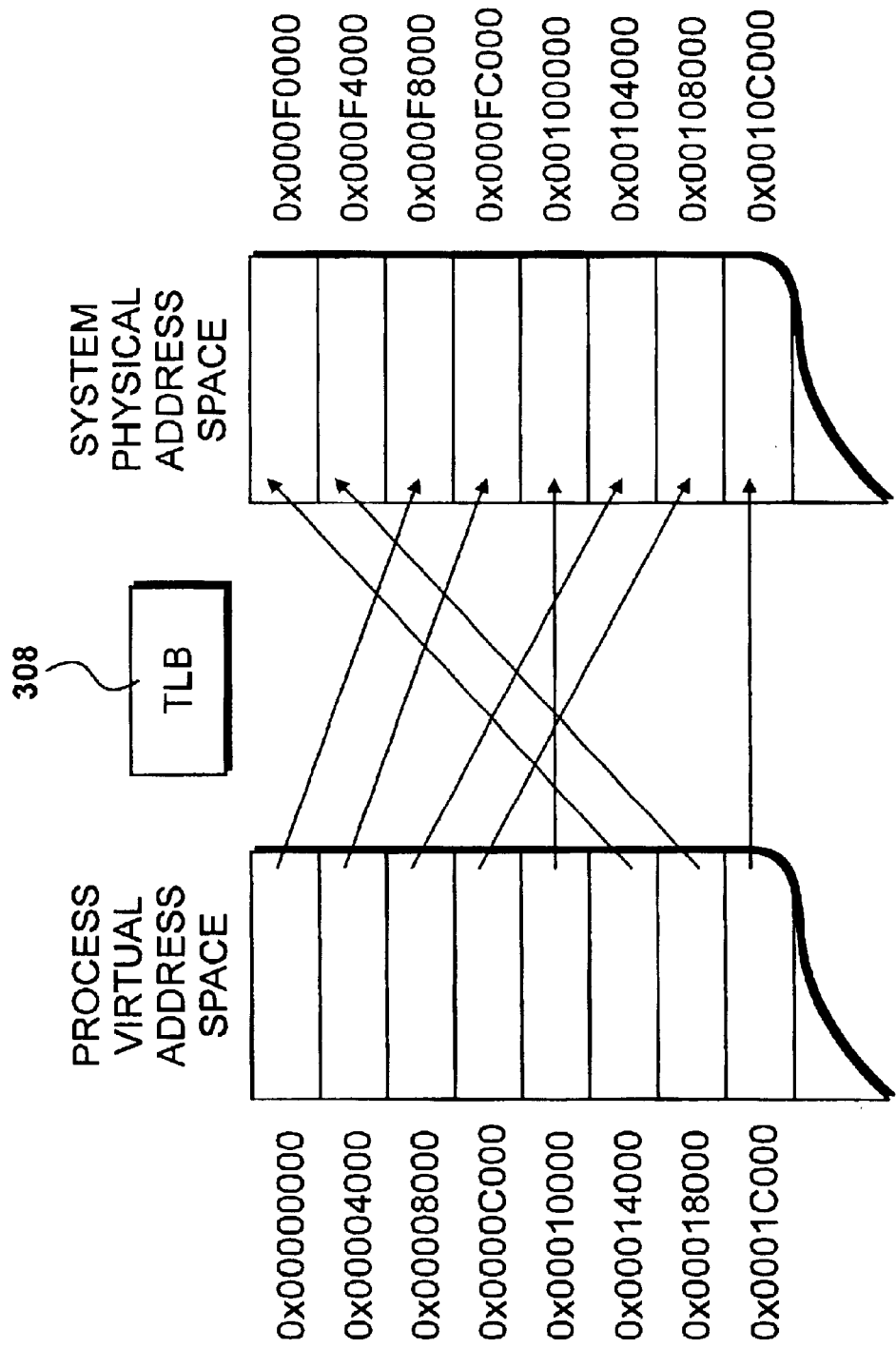
FIG. 7 illustrates operation of the translation look-a-side buffer shown in FIG. 3.

A translation look-a-side buffer (TLB) 308, 309, on each processor 201 and 202, contains translations between virtual addresses and physical addresses. The translation is performed on a page by page basis, and each page is 16 k bytes in size. The operation of the translation look-a-side buffer 308 is illustrated in FIG. 7. Here, each virtual address space is shown mapping on to a corresponding physical address space. The addresses are given in thirty-two bit hexadecimal form, and are intended for the purposes of illustration only.

The problem resulting from this scheme is that an application cannot determine the physical location of its data, because it only has access to virtual address information. This could be mapped to any possible physical location on a page by page basis. A cache line is selected by address signals. The address may be a virtual or physical address. If the cache is entirely virtually addressed, then cache pattern dependency can be evaluated, because all the relevant patterns are visible to the process, or the programmer who is writing the process. If the cache is physically addressed, then patterns of access are not available for analysis at the process level; only the operating system sees physical addresses.

Figure 8:
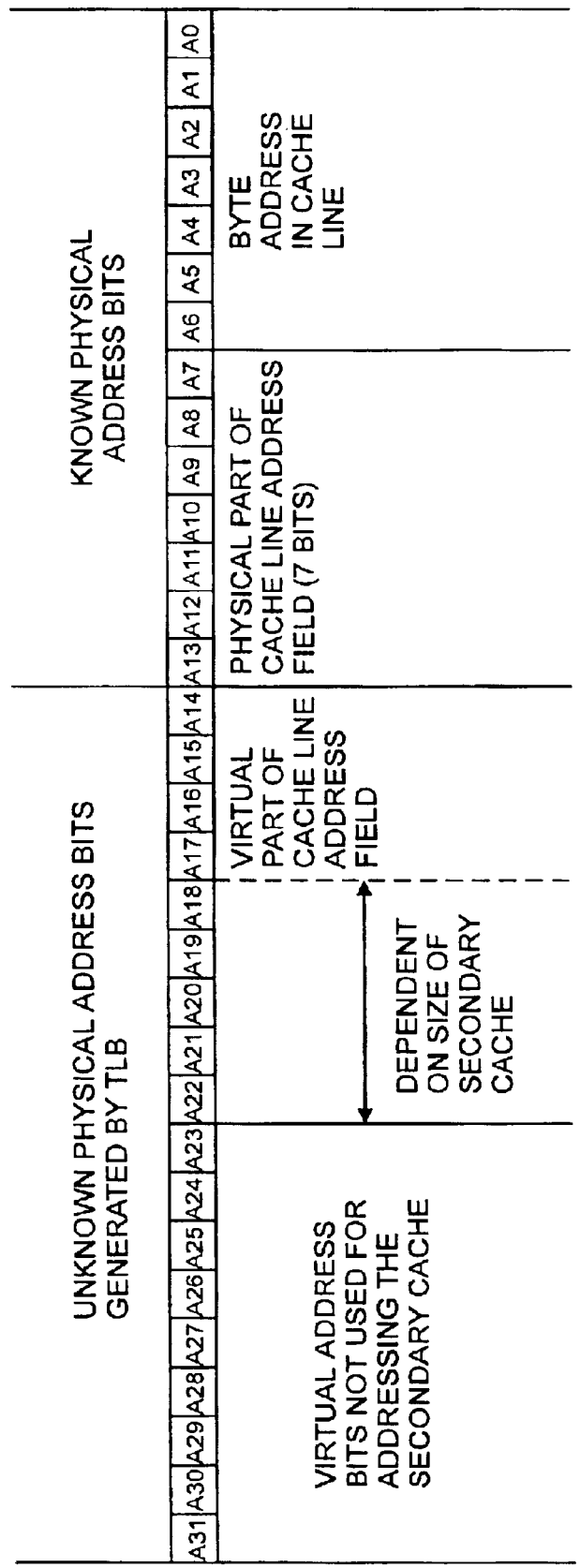
FIG. 8 details a first embodiment of the present invention, in which bits of the virtual address field address the physically indexed secondary cache shown in FIG. 6, including selected line address bits.

The virtual address field is shown in FIG. 8. There are thirty-two address bits, denoted A31:0. Because the virtual addresses are translated on a page by page basis, certain of the virtual address bits are the same as the physical address bits. Given a page size of 16 k bytes, it can be seen that virtual address bits A13:0 are the same as the physical address bits. A 4M byte secondary cache makes use of physical addresses A19:0, of which A19:14 are unknown to the application. However, cache address bits A13:0 are known, because they are common to both physical and virtual address space. This information can be used to avoid the worst effects of address pattern dependency. Of the fourteen bits that can be used, bits A6:0 address the byte within a line of data, and so are not used to generate an offset. This leaves bits A13:7 for use by an application to avoid address pattern dependency problems in the cache.

Microprocessors other than the R10000 have virtually indexed secondary cache circuits. Under these circumstances, the full cache address field is visible to the application. Most systems include both primary and secondary cache circuits. In an alternative embodiment of the present invention, shown in FIG. 9, selected bits are identified from the address field in order to avoid address pattern dependency in both the primary and secondary cache.

Figure 9:
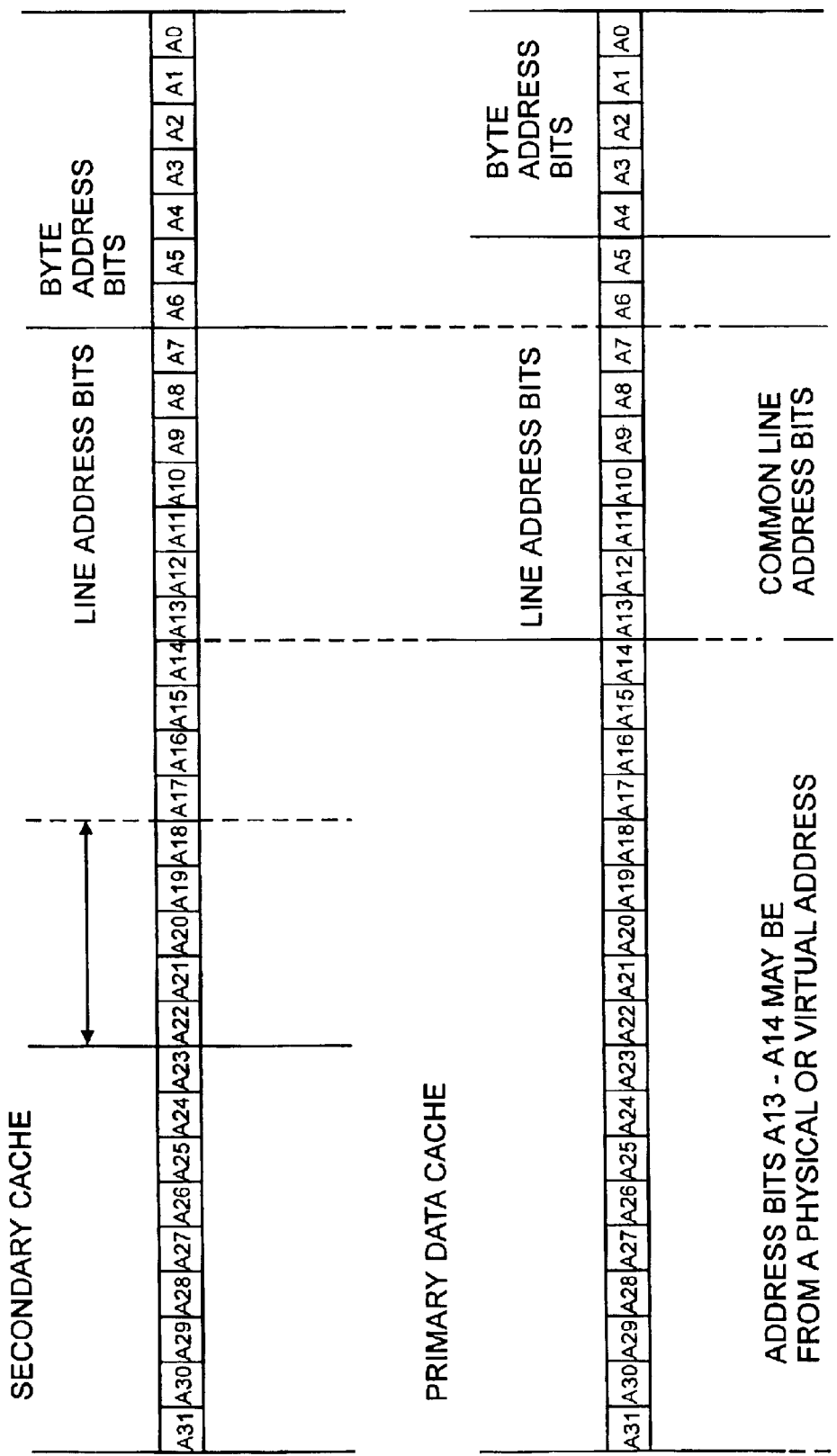
FIG. 9 details an alternative embodiment of the present invention, in which line address bits common to a physically or virtually indexed secondary cache and a virtually indexed primary data cache are identified.

In FIG. 9, the role of address bits is analysed for each of a primary data cache and a secondary cache. The secondary cache may be virtually of physically indexed, and in all other respects is identical to the previously example. In the secondary cache, address bits A6:0 select the byte within a cache line. There are one hundred and twenty-eight bytes in each cache line. Address bits A22:7 are used to select a cache line. Cache line selection bits are dependent upon the size of the cache. A19:7 are used in a 2 Mbyte two-way set associative cache.

The primary data cache is a thirty-two kbyte two-way set associative cache. It is virtually indexed. This type of cache is used for the primary data cache 306 or 307 of the R10000 microprocessor shown in FIG. 3. In the primary data cache address bits A4:0 index the byte in a cache line. There are thirty-two bytes in each cache line. Bits A13:5 index the cache line, of which there are 512. The remaining address bits A31:14 are not used by the primary data cache.

Common line address bits for both the primary data cache and the secondary cache may be identified as address bits A13:7. These are used to determine offset addresses for buffers, such that neither the primary nor the secondary cache circuits suffer from critical address pattern dependency.

Permutations of address bits A13:7 are selected for generating cache alignment values. The use of these bits is detailed in FIG. 10. Thirty-two possible alignments are generated by permutations of address bits A13:9. Four secondary cache lines are provided between each alignment by setting bits A7:8 to zero. This also gives sixteen primary data cache lines between each alignment, according to the arrangement shown in FIG. 9.

Each of the different cache alignments identified in FIG. 8 or FIG. 9 can be considered as a separate colour, which can then be allocated to buffers so that they make efficient use of the resources of the secondary cache and of the primary cache. When a colour is allocated to a buffer, the buffer's base address is constructed by setting bits A13:7 in accordance with the bit pattern for the allocated colour, as shown in FIG. 10.

Figures 10, 11:
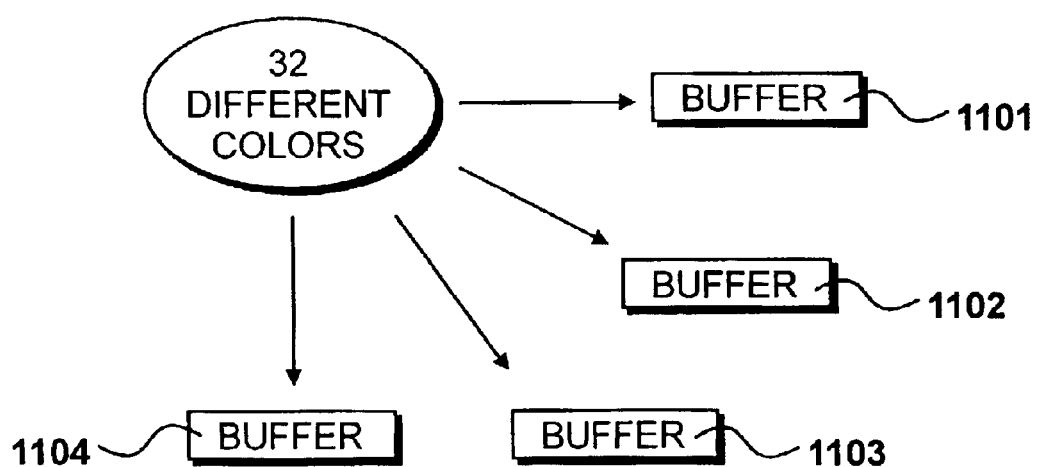
FIG. 10 details line address bits identified in FIGS. 8 and 9, including bits for defining buffer alignments.
FIG. 11 illustrates the allocation of buffer alignments in an application.

FIG. 11 illustrates a plurality of buffers 1101 to 1104 required for an application. Thirty-two different alignments are available, and these are assigned to the buffers, so that excessive address pattern dependence in the caches can be avoided.

Figure 12:
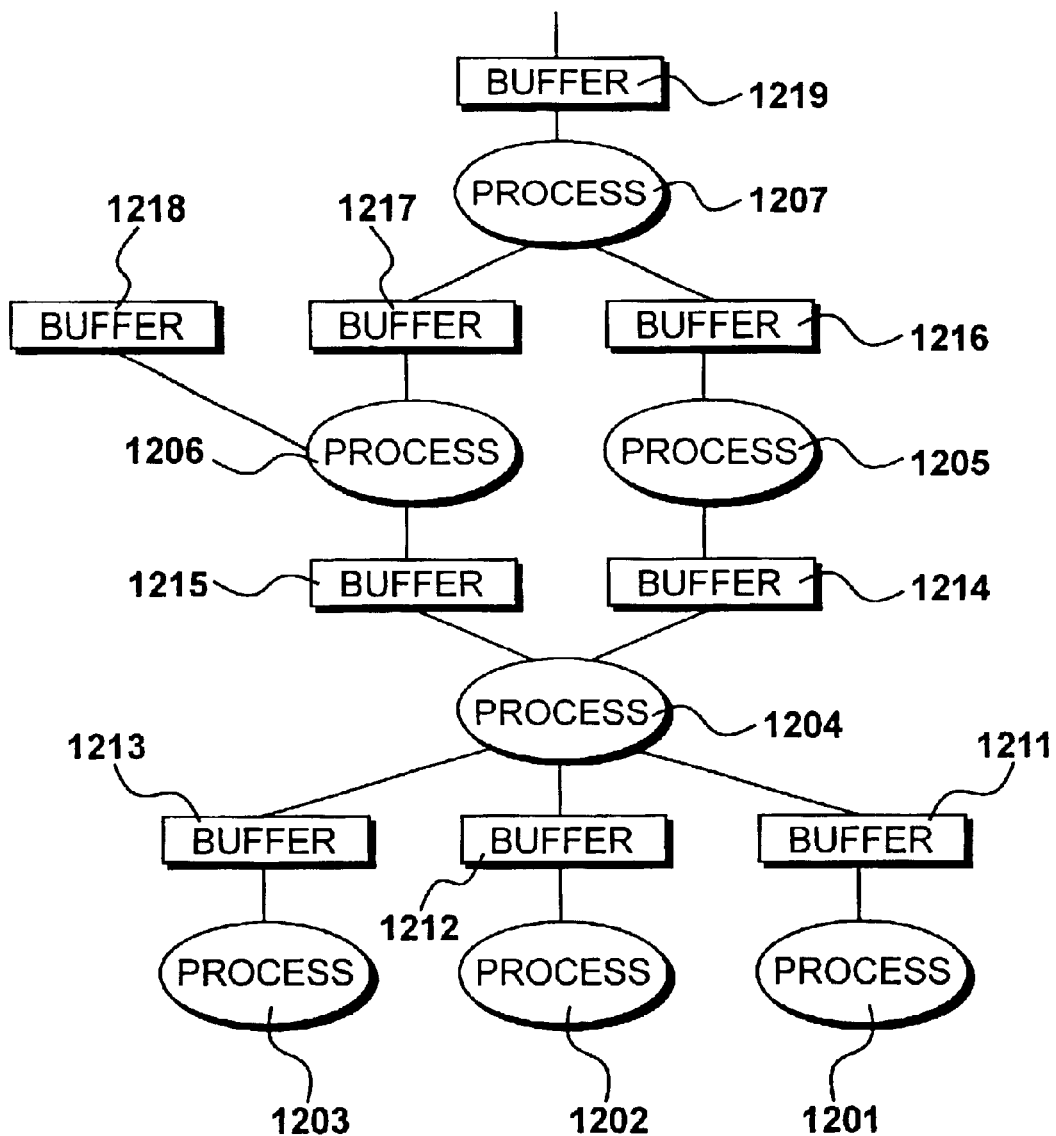
FIG. 12 shows an example of a processing graph in which buffers are allocated the alignments identified in FIG. 10.

Another example of a processing graph is shown in FIG. 12. This processing graph is more typical of the complexity of an application for processing image data. A processing graph of this type may be constructed or modified in response to user operations. The processing graph may also change in response to a time parameter, as different types of processing will occur at different times in a typical video or audio edit. Alternatively, the processing graph may change in response to time and or other parameters that are generated during a live broadcast. Whenever the processing graph changes, buffer locations may need to be updated. Under these circumstances, it is essential that the allocation of buffer addresses be performed with high speed and efficiency.

Processes 1201 to 1207 are connected by buffers 1211 to 1219. Allocation of buffer alignments, or colours, can be made by considering the number of buffers that a process is connected to. For example, process 1203 is connected to only buffer 1213. Process 1204 is connected to five different buffers 1211, 1212, 1213, 1214 and 1215. Each of these buffers 1211 to 1215 must be allocated a different colour. Moving further up the graph, process 1206 is connected to buffers 1215, 1217 and 1218. Buffer 1215 may have already been coloured, and so this reduces the permutations for the colouring of buffers 1217 and 1218.

The problem of colouring a graph in this way is known in the art of compiler optimisation, and more widely in mathematics as the graph colouring problem. Thus, algorithms are available for assigning a restricted number of colours to a graph of this type. The invention applies graph colouring to the problem of avoiding critical cache addressing patterns. By considering the address bits identified in FIG. 10 as defining preferred alignments within the cache, these may be used to avoid the worst cache addressing patterns, even in a physically addressed cache, where not all of the address bits seen by the cache can be defined.

Figure 13:
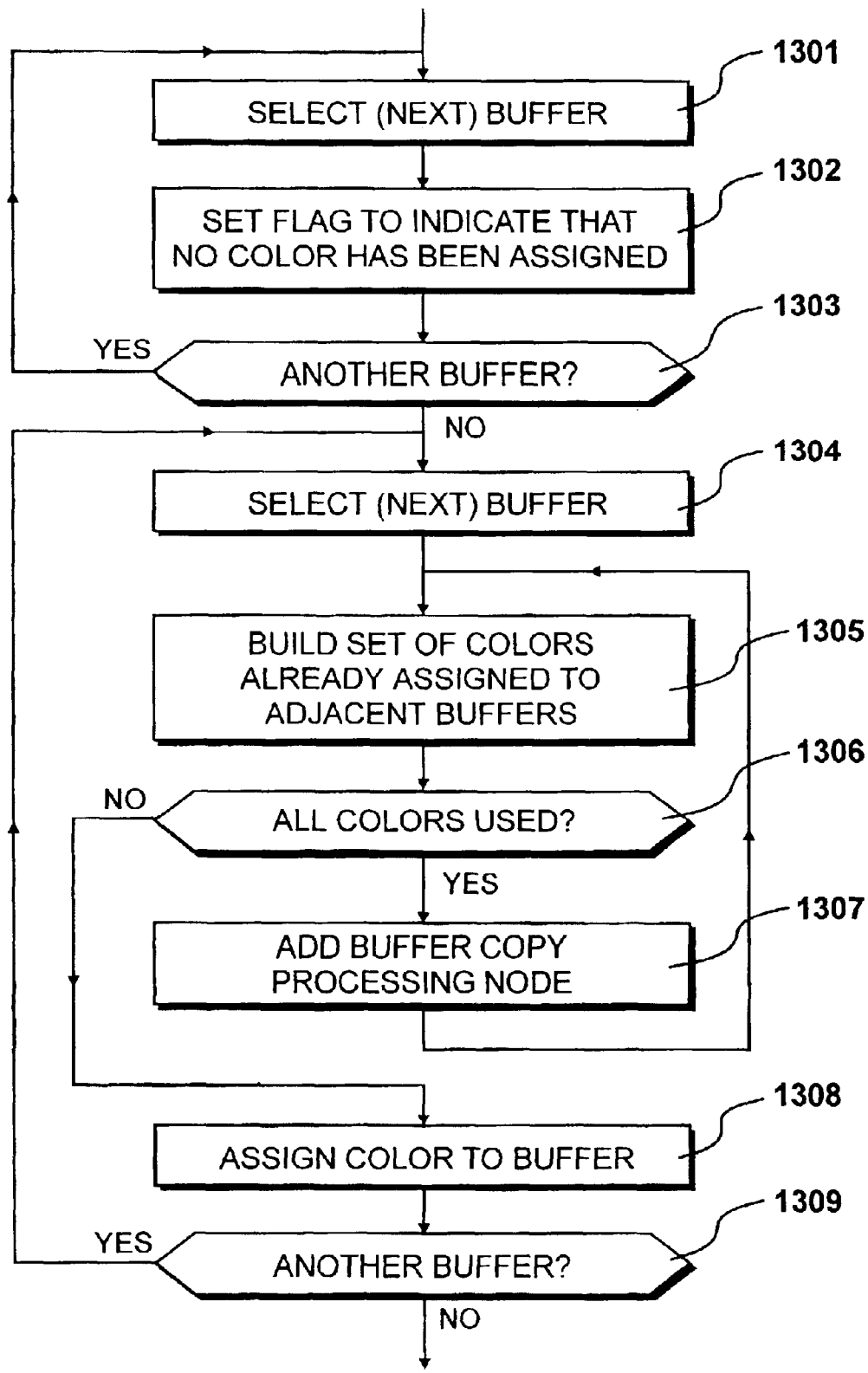
FIG. 13 details a method for allocating the buffer alignments shown in FIG. 10 to a processing graph of the type illustrated in FIG. 12, including a step of adding a buffer copy processing node.

In graphics processing, it is usual for the processing graph to change as a result of changes to edit operations that are performed by an operator. Also, it is possible for changes to the processing graph to be made over time during an edit sequence. When changes are made, it may be necessary to allocate new buffer resources. A method for colouring buffers in a processing graph is shown in FIG. 13. These steps are executed when the application initialises a processing graph.

At step 1301 a first buffer in the processing graph is selected. At step 1302, a flag for the buffer is set, indicating that the buffer has not been allocated a colour. At step 1303 a question is asked as to whether all buffers have been considered. If not, control is directed to step 1301, and the next buffer is selected. Steps 1301 to 1303 have the effect of traversing the processing graph such that each buffer is visited only once, and flags are set so that all buffers are considered as not having a colour.

At step 1304 the first buffer in the processing graph is selected again. At step 1305 all the buffers adjacent to the selected buffer are examined. Each adjacent buffer may or may not have a colour assigned to it. By way of an example, considering buffer 1217 shown in FIG. 12, adjacent buffers are 1215, 1216, 1218 and 1219. Non-adjacent buffers are 1211, 1212, 1213, and 1214. A buffer is considered adjacent if a single process 1207 or 1206 forms a link to it. At step 1306 a question is asked as to whether all the available colours have been used. If so, control is directed to step 1317, where a buffer copy processing node is added to the processing graph, along with an additional buffer. Thereafter, the set of colours already assigned is updated, at step 1305, and the question at step 1306 will then be answered in the negative. The step 1307 of adding a buffer copy processing node will be later explained by an example.

At step 1308 it is known that at least one colour is available that may be assigned to the buffer, and the buffer is assigned this colour. In practice, this results in a base address for the buffer being determined, wherein bits A13:9 are set in accordance with the allocated colour, and bits A8:7 are set to zero. At step 1309 a question is asked as to whether any buffers remain that require a colour to be allocated. If answered in the affirmative, control is directed to step 1304, alternatively, if all buffers have been coloured, this marks the end of the colouring algorithm, and all buffer base addresses will have been assigned.

In the preferred embodiment, each colour is represented by a single bit in a data word of thirty-two bits. At step 1305, the set of colours already assigned can be formed by performing an addition with each of the colours of adjacent buffers that have already had colours assigned. Then, at step 1306, another simple operation can be performed to determine whether all bits have been set. If not, a clear bit is identified and set in the associated colour register for the selected buffer. This is performed at step 1308. The representation of colours by individual bits in a single data word enables the algorithm to be executed with high speed, and whenever buffers are added to the processing graph.

Figure 14:
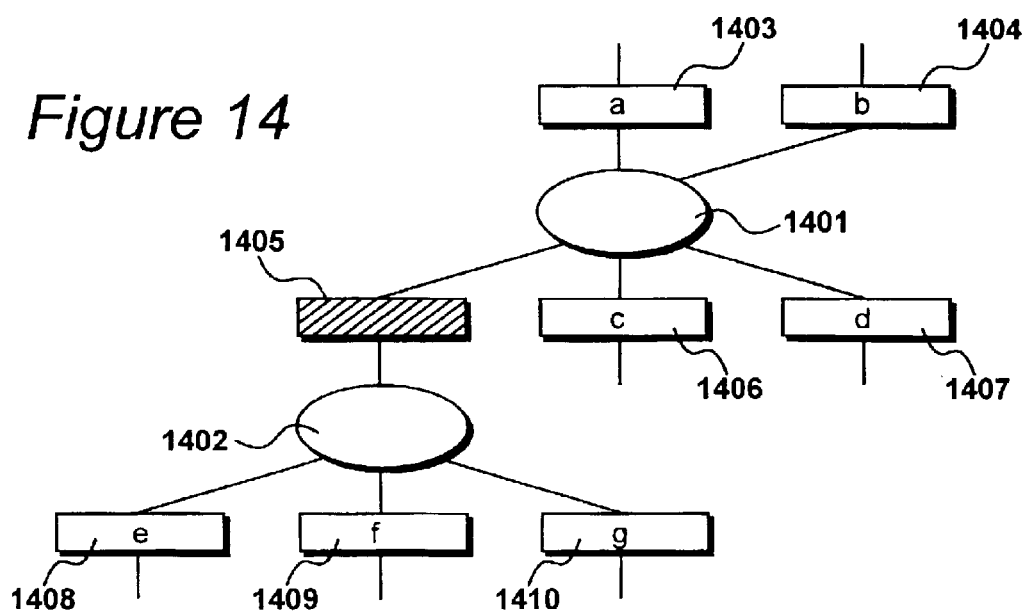
FIGS. 14 and 15 illustrate the step of adding a buffer copy processing node shown in FIG. 13.
Figure 15:
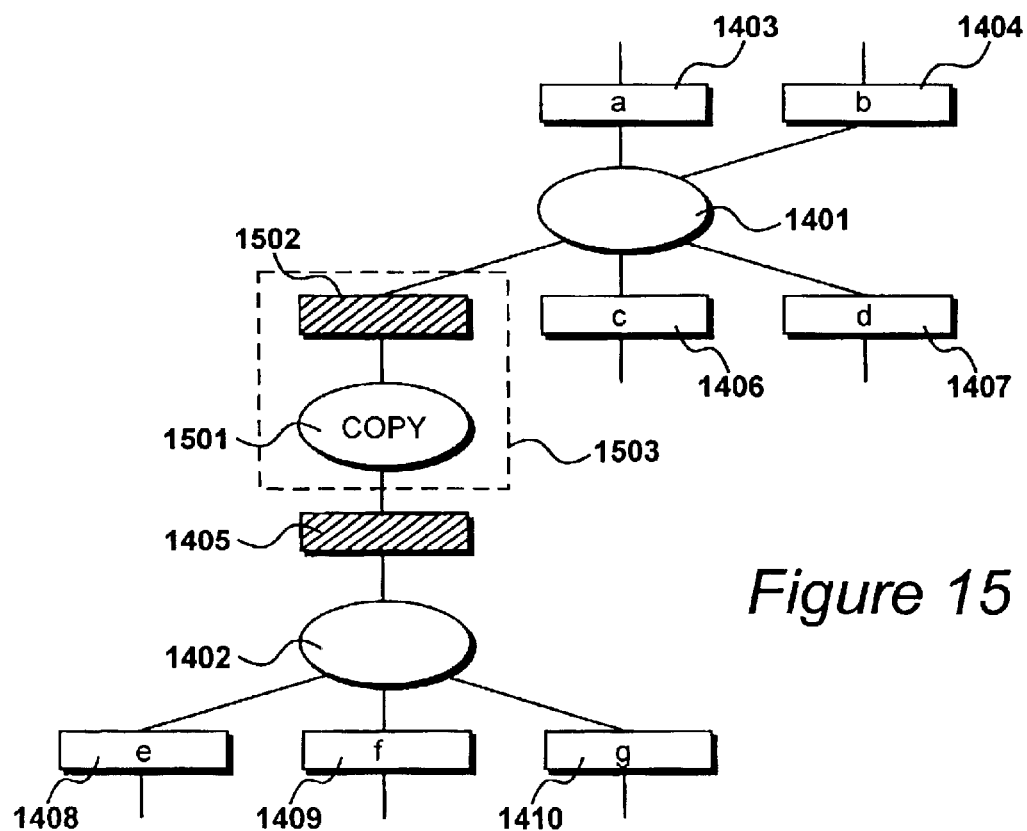

The step 1307 of adding a buffer copy processing node is illustrated in FIGS. 14 and 15. FIG. 14 shows a section of a processing graph that has been partly coloured. There are two processes 1401 and 1402, and eight buffers 1403 to 1410. To explain the process, it is assumed that there are only seven colours available, labelled a, b, c, d, e, f and g. In FIG. 14, only buffer 1405 remains to be coloured.

However, due to the fact that there are seven adjacent nodes, all the colours have been used up. This makes it impossible to allocate a colour to buffer 1405. The solution is to add a copy buffer processing node. This has been done in FIG. 15.

In FIG. 15, buffer 1405 is no longer adjacent to buffers 1403, 1404, 1406 or 1407, and so any of colours a, b, c or d may be used to colour it. A buffer copy processing node 1501 has been inserted, along with an additional buffer 1502. The inserted items are shown with a dotted line 1503. Also, the newly inserted buffer 1502 is not adjacent to buffers 1408, 1409 or 1410, and so any of colours e, f or g are available for it. In practice, more complex processing graphs are often constructed, but many more colours are available, and the requirement to insert a buffer copy processing node is rarely encountered. The arrangement has a restriction, in that the number of adjacent buffers is restricted to thirty-two. This cannot be solved by inserting a buffer copy processing node. However, in practice, this number of adjacent buffers is not required. The cost of adding a buffer copy processing node is much lower than the cost of cache thrashing that might otherwise occur. For example, using the system of the preferred embodiment, copying a buffer, which is the operation that results when a buffer copy node is present, may take nineteen milliseconds. In contrast, the worst case cache thrashing that may occur without the buffer copy node is about four hundred milliseconds, in the same context.

In practice, it is possible that a processing graph is modified, rather than constructed from scratch. When buffers are deleted, no re-colouring needs to be performed. If a buffer or buffers are added, existing buffer colours must remain unchanged if they contain valid data. Under these circumstances, steps 1304 to 1309 of FIG. 13 are performed for each of the new buffers that are to be added, including the possibility of adding a buffer copy processing node at step 1307.

What is claimed is:

1. In a system for the processing of data having a main memory, first primary data cache, and a secondary cache, a method of caching data stored in main memory so as to mitigate the effects of address pattern dependency, comprising the steps of:

obtaining address bits wherein a certain portion of said address bits are the same in virtually addressed primary data cache, secondary cache, and respective main memory physical address bits;

selecting the portion of said address bits that are the same;

generating cache offset addresses for buffers used for input and/or output image frames, to avoid address pattern dependencies, using said selected bits; and writing data to one of said buffers at said first primary date cache at offset positions derived from said cache offset values.

2. A method according to claim 1, wherein said step of selecting a portion of address bits identifies bits that address bytes within a line of data and makes a selection form the remaining bits.

3. A method according to claim 1, further comprising transferring the data from said first primary data cache to said secondary cache at the cache offset address generated from said selected portion of address bits.

4. A method according to claim 1, wherein said data is image data consisting of a plurality of frames each forming part of one of a plurality of clips;

a process is performed on a first chip in combination with a second chip by writing frames of said first clip from main memory to said first primary data cache and by writing frames of said second chip into said primary date cache; and data writes occur at said offset positions to minimize the risk of said second frame write overwriting data of said first frame write.

5. A method according to claim 1, wherein image data is transferred from an external device to said main memory by a process of direct memory access.

6. A method according to claim 1, wherein said main memory is constructed from dynamic RAM and said first primary data cache is constructed from static RAM.

7. The method according to claim 1, further comprising generating cache alignment values using permutations of the selected portion of said address bits.

* * * * *

UNITED STATES PATENT AND TRADEMARK OFFICE
CERTIFICATE OF CORRECTION

PATENT NO. : 6,977,657 B2  
APPLICATION NO. : 10/214643  
DATED : December 20, 2005  
INVENTOR(S) : Benoit Belley It is certified that error appears in the above-identified patent and that said Letters Patent is hereby corrected as shown below:

Column 11, line 38, before "first insert --a--;

Column 12, line 9, "date" should read --data--;

Column 12, line 23, "chip" should read --clip--

Column 12, line 24, "chip" should read --chip--

Column 12, line 26, "after "said" insert --first--;

Column, line 27, "date" should read --data--.

Signed and Sealed this

Fifteenth Day of August, 2006

JON W. DUDAS  
*Director of the United States Patent and Trademark Office*

UNITED STATES PATENT AND TRADEMARK OFFICE
CERTIFICATE OF CORRECTION

PATENT NO. : 6,977,657 B2  
APPLICATION NO. : 10/214643  
DATED : December 20, 2005  
INVENTOR(S) : Benoit Belley Page 1 of 1

It is certified that error appears in the above-identified patent and that said Letters Patent is hereby corrected as shown below:

Column 12, line 24, "chip" should read --clip--.

Signed and Sealed this

Ninth Day of January, 2007

JON W. DUDAS  
*Director of the United States Patent and Trademark Office*